(No Model.) 3 Sheets—Sheet 3.

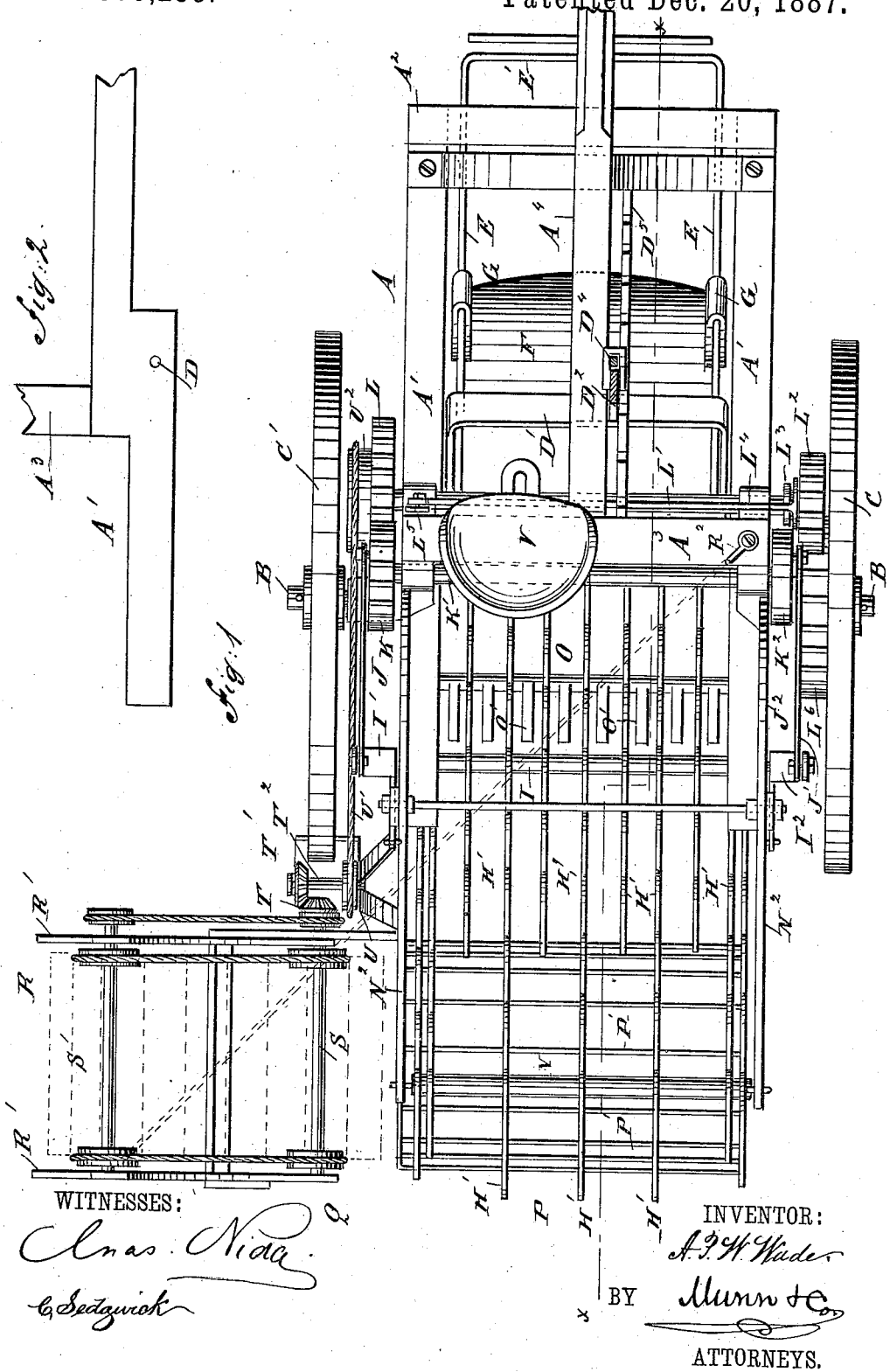

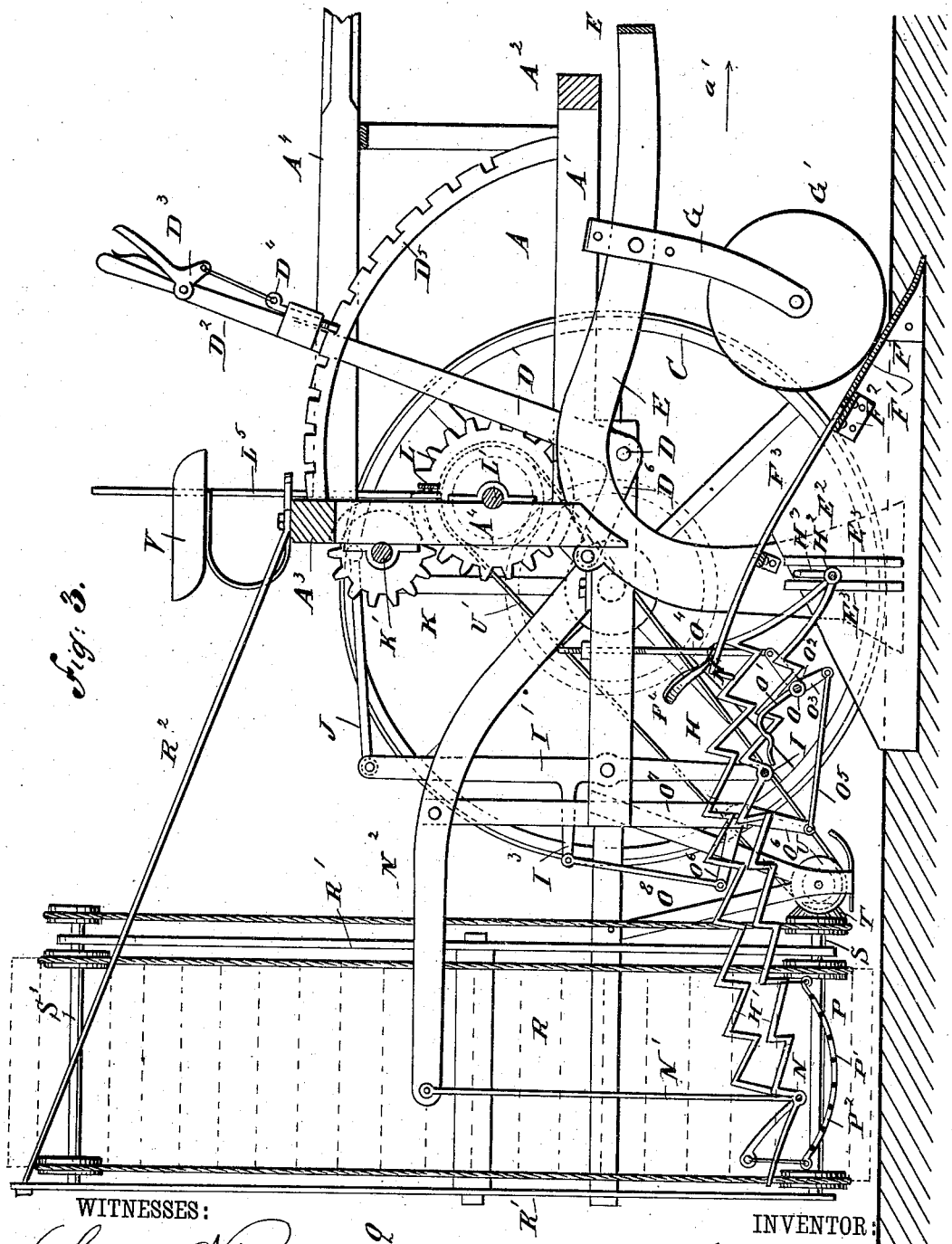

A. P. W. WADE.
COMBINED POTATO DIGGING AND HARVESTING MACHINE.

No. 375,235. Patented Dec. 20, 1887.

WITNESSES:

INVENTOR:
A. P. W. Wade
BY Munn & Co.
ATTORNEYS.

ated near the rear ends of the
UNITED STATES PATENT OFFICE.

ARTHUR P. W. WADE, OF CEDAR CITY, MISSOURI.

COMBINED POTATO DIGGING AND HARVESTING MACHINE.

SPECIFICATION forming part of Letters Patent No. 375,235, dated December 20, 1887.

Application filed March 23, 1887. Serial No. 232,102. (No model.)

*To all whom it may concern:*

Be it known that I, ARTHUR P. W. WADE, of Cedar City, in the county of Callaway and State of Missouri, have invented a new and Improved Combined Potato Digging and Harvesting Machine, of which the following is a full, clear, and exact description.

The object of my invention is to provide a new and improved combined potato digging and harvesting machine, by which the potatoes are plowed out of the ground, separated from the dirt and sticks, and transferred to a wagon or dropped in a row alongside the machine.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 4:
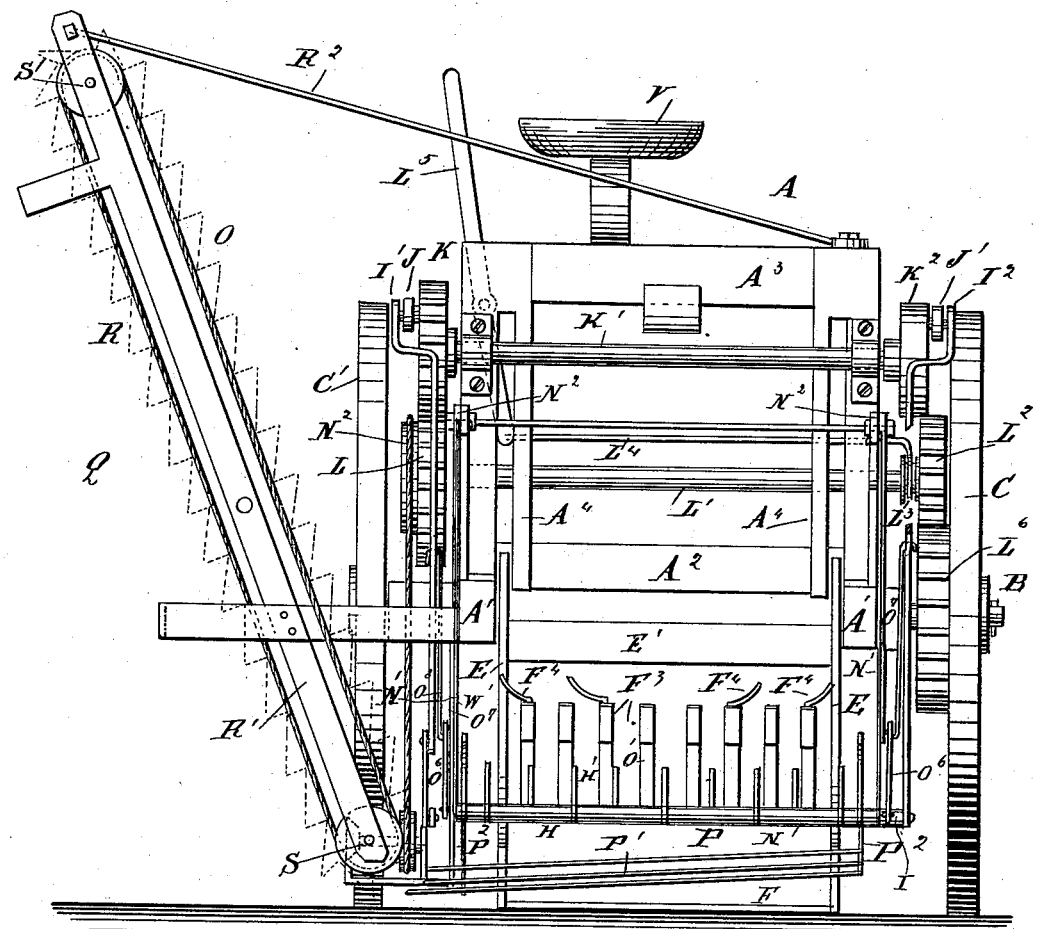
Figure 5:
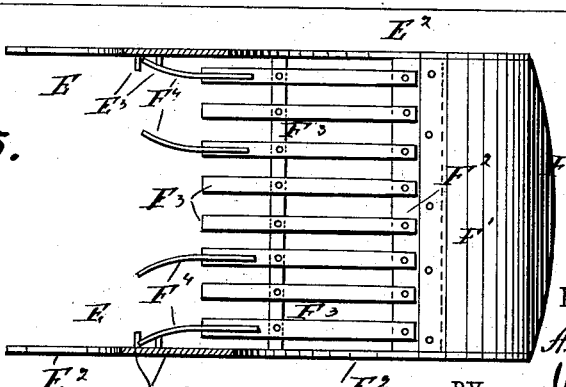

Figure 1 is a plan view of my improvement. Fig. 2 is a side elevation of part of the main frame. Fig. 3 is a longitudinal sectional elevation of my improvement on the line $x\ x$ of Fig. 1. Fig. 4 is a rear end elevation of the same; and Fig. 5 is a sectional plan view of the plow.

My improved machine is supported on a frame, A, provided with spindles B, on which are mounted the driving-wheels C and C'. The frame A is made of two side pieces, A', each having its front part raised sufficiently to allow the raising of the plow, as shown in Fig. 2. The side pieces or beams A' of the frame A are united in front by the cross-beam A², and a U-shaped bridge, A³, is erected on the said beams, near the junction of the front and rear parts of the said beams. On the frame A is fastened the tongue A⁴, which projects in front and is provided with the usual means for attaching the horses.

On the inside of each side beam A' is secured a pivot, D, on which are fulcrumed the lower forked ends of the lever D', which extends upward, and has its handle D² provided with a spring-lever, D³, which operates a pawl, D⁴, adapted to engage the notched segmental bar D⁵, secured to the frame A, and serving to hold the lever D' in any desired position. From the pivot-point of the forked lower ends of the lever D' extend the arms D⁶, pivotally connected at their outer ends with the plow-beams E, which extend on the inside of each side beam A' toward the front, and are united at their front ends by a cross-piece, E'.

The plow-beams E are curved downward at their rear ends, and are each connected with a triangularly-shaped piece, E², extending toward the front and rear, the base of the triangular piece E² being parallel with the ground. The triangular pieces E² are united in front by the similarly-shaped plowshare F, provided with the top plate, F', secured to the cross-plate F², bolted to the pieces E², and from the rear end of the top plate, F', extend the upwardly-inclined parallel bars F³, which are bent downward at their extreme rear ends. Some of the bars F³, near each side and in the middle of the machine, are provided with outwardly and upwardly curved arms F⁴. The downward-bent ends of the bar F³ prevent the potatoes after passing on the shaker from rolling toward the front.

On the front part of each plow-beam E is held a vertically-adjustable bracket, G, carrying on its lower end a cutting-wheel, G', held above the upper edges of the front part of the triangular piece E² of the plow-beam E. The rear ends of the bars F' open upon the shaker H, provided with rearwardly-extending corrugated rods H', secured at their inner ends to a cross-bar, H², provided at each end with a crank-arm, H³, held with its crank-pin in vertically-arranged guides E³, secured to the inside of the triangular piece E² of the plow-beam E. The corrugated rods H' are also secured to the cross-bar I, pivotally connected at each end with the upright lever I' or I², respectively, fulcrumed near the rear ends of the side beams A' of the frame A.

The upper end of the lever I' is connected by the pitman J with a crank-pin secured on the gear-wheel K, fastened on one end of the transverse shaft K', mounted in suitable bearings on the rear of the bridge A³ of the frame A. The upper end of the other lever I² is similarly connected by a pitman, J', with the crank-disk K², secured on the other end of the said shaft K'. The gear-wheel K meshes into a gear-wheel, L, secured on the transverse shaft L', mounted in suitable bearings on the front of the bridge A³, the other end of the shaft L' being provided with a spline, on which is mounted the gear-wheel L², adapted to slide sidewise by means of a grooved collar, L³, on the said gear-wheel L², and engaging the forked end of the transverse rod L⁴, operated by a lever, L⁵, pivoted on one side of the bridge A³ and extending upward. The gear-wheel L² can, by means of the lever L⁵, be thrown in or out of gear with a gear-wheel, L⁶, secured to the inside of the driving-wheel C.

The outer ends of some of the corrugated rods H' of the shaker H are secured to a cross-bar, N, supported at its ends by the links N', pivotally connected with the outer ends of the brackets N², secured to the rear ends of the respective side beams A' of the frame A. Under the corrugated rods H' of the shaker H, near their front ends, is placed a set of agitators, O, consisting of the corrugated rods O', extending up and between the rods H' and secured to an oscillating shaft, O², provided on each outer end with a bell-crank lever, O³, one arm of which is supported by the screw-rod O⁴, held adjustably on the respective side beam A' of the frame A. The other arm of each bell-crank lever O³ is connected by the link O⁵ with one arm of the bell-crank lever O⁶, pivoted on a bracket, O⁷, extending downward from the rear end of the respective side beam A'. The other arm of this bell-crank lever O⁶ is connected by the link O⁸ with an arm, I³, extending toward the rear from the respective lever I' or I², which lever imparts a rocking motion to the agitator O.

The two outer corrugated rods H' are somewhat raised from the middle rods, and above these two an additional set of rods may be arranged, thus forming a high guide-flange on each side of the shaker H, to prevent the potatoes from rolling off the shaker at the sides. Under the rear ends of the rods H' is suspended a transversely-arranged chute, P, formed of transverse parallel rods P', secured at their ends to the curved bars P², suspended below the rods H'. The chute P is transversely inclined and its lower end opens upon the buckets of the elevator Q, mounted on the frame R, supported on the rear end of one of the side beams A' of the frame A.

The elevator O, of any approved construction, is provided with the pulley-shafts S and S', mounted at the upper and lower ends of the side beams R' of the frame R, and the said pulley-shafts S and S' are provided with the usual pulleys, over which pass an endless belt or belts carrying the elevator-buckets of any approved construction. The lower pulley-shaft, S, is provided with a bevel gear-wheel, T, meshing into the bevel gear-wheel T', secured on the transverse shaft T², mounted in the elevator-frame R, and carrying a pulley, U, over which passes the endless belt U', also passing over the pulley U², formed on the outer face of the gear-wheel L, which, when rotated, operates the elevator Q.

Some of the corrugated rods H' do not extend to the bar N, but terminate in a cross-bar near the inner side of the chute P, as shown in Fig. 1. The driver's seat V is placed on top of the bridge A³, so that the driver has within convenient reach the levers D² and L⁵.

The elevator-frame R is braced by the rod R², connected with the bridge A³. The part of each plow-beam E connected with the arms D⁶ is held between guides A⁴ formed on the bridge A³.

The operation is as follows: The plow is raised or lowered by throwing the lever D' forward or backward, according to the depth to which the plow F is intended to cut, so as to dig up all the potatoes in the ground. When the machine is moved forward in the direction of the arrow a', then the plowshare F' digs up the potatoes in one row, and the potatoes, earth, plants, and weeds pass upon the top plate, F², of the plowshare F', and upon the bars F³, on which the loose earth is separated and drop through said bars into the furrow made by the plowshare F'. Some of the plants and weeds are cut away by the action of cutters G'; but the rest of the potatoes, weeds, and plants pass from the bars F³ upon the shaker H, which receives a forward and backward swinging motion from the oscillating levers I' and I², connected with the crank-wheels K and K², which receive a rotary motion from the gear-wheels L, L², and L⁶, the latter being rotated on the forward motion of the machine from the driving-wheel C. The links N', supporting the rear end of the shaker, and the crank-arm H³, connected with the front end of the shaker H, permit such a forward and backward swinging motion of the shaker H. This swinging motion of the shaker causes the potatoes and the rest of the plants and weeds to pass over the corrugated rods H' toward the rear, as the shape of the corrugated rods H' prevents a return-movement of the material placed on the same. The swinging motion of the agitator O is derived from the oscillating levers I' and I², and causes a complete separation of the weeds and plants from the potatoes, which latter pass finally upon the chute P at the end of the short rods H', which open upon the said chute P, while the weeds and plants are discharged at the rear end of the long rods H', which extend beyond the chute P. The potatoes falling upon the chute P roll down the incline of the latter and fall into the elevator-buckets, which carry the potatoes upward and empty the same into a wagon-bed traveling with the machine in close proximity to the elevator Q, or the potatoes are dropped in a row extending in the direction in which the machine travels.

The operator can stop the swinging motion of the shaker H and the agitator O by moving the lever L⁵ to the right, so that the gear-wheel L² is thrown out of mesh with the gear-wheel $L^6$ on the driving-wheel C. The shaft $L'$ then ceases to rotate, and the movement of the elevator is thereby stopped, as the latter is actuated from the said gear-wheel $L^2$. The potatoes, in passing over the corrugated rods $H'$, are cleaned from the earth which may adhere to them, and are thus delivered in a clean state to the elevator-buckets.

Having thus fully described my invention, I claim as new and desire to secure by Letters Patent—

1. The combination, with a plow, a shaker having a forward and backward motion, upon which shaker opens the said plow, and an agitator operating on the said shaker, of an elevator connected with the rear end of the said shaker and delivering the potatoes from the shaker to a wagon, or in a row, substantially as shown and described.

2. The combination, with an adjustable plow, a shaker having a forward and backward motion derived from the main driving-wheel, and a transversely-inclined chute connected with the said shaker, of an elevator operated simultaneously with the said shaker and connected with said inclined chute, so that the potatoes from the chute fall into the buckets of the elevator, substantially as shown and described.

3. The combination, with an adjustable plow having rearwardly-extending bars, a shaker upon which open the said bars, said shaker having a forward and backward motion derived from one of the driving-wheels, of an agitator operating on the said shaker and having a swinging motion simultaneous with the motion of the shaker, a transversely-inclined chute connected with the rear end of the said shaker, and an elevator upon which opens the lower end of the said chute, the said elevator being operated from the main driving-wheel simultaneously with the shaker and the agitator, substantially as shown and described.

4. The combination, with a plow, of rearwardly-extending bars, a shaker provided with corrugated rods extending toward the rear from the said bars, and means, as described, for imparting a forward and backward swinging motion to the said shaker from the main driving-wheel, substantially as set forth.

5. The combination, with a plow having rearwardly-extending bars, of a shaker provided with corrugated rods extending toward the rear from the said bars, means, as described, for imparting a forward and backward motion to the said shaker, an agitator provided with corrugated bars operated between the said corrugated rods of the shaker, and means, as described, for imparting a swinging motion to the said agitator from the said means for operating the shaker, substantially as shown and described.

6. The combination, with a shaker provided with corrugated rods and having a forward and rearward swinging motion, of a chute suspended on the rear end underneath the said shaker and having transversely-arranged inclined bars, substantially as shown and described.

ARTHUR P. W. WADE.

Witnesses:
THOS. J. CRAIGHEAD,
LEMUEL D. FARMER.